Feb. 28, 1967　　　　R. DAHLIN ETAL　　　　3,306,416
ELECTROMECHANICAL CONTROL FOR EMBOSSING MACHINES
WHICH ROTATES FONT PAST AND BACK TO
SELECTED CHARACTER
Filed June 23, 1965　　　　　　　　　　　　8 Sheets-Sheet 1

Rolf Dahlin
Göte Johansson
INVENTORS

BY *Wenderoth, Lind & Ponack*
ATTORNEYS

Rolf Dahlin
Göte Johansson
INVENTORS

BY Wenderoth, Lind & Ponack
ATTORNEYS

Feb. 28, 1967  R. DAHLIN ETAL  3,306,416
ELECTROMECHANICAL CONTROL FOR EMBOSSING MACHINES
WHICH ROTATES FONT PAST AND BACK TO
SELECTED CHARACTER
Filed June 23, 1965  8 Sheets-Sheet 4
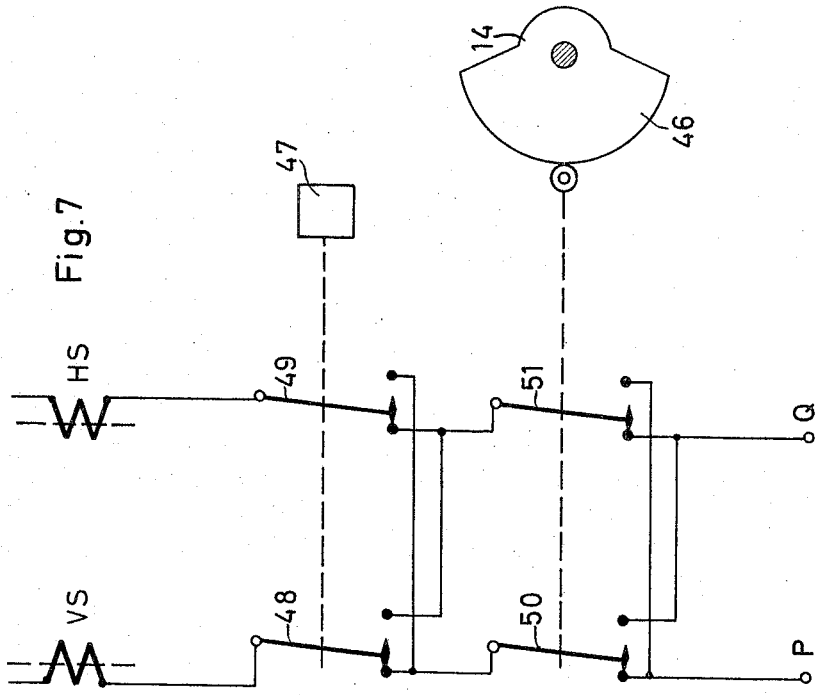
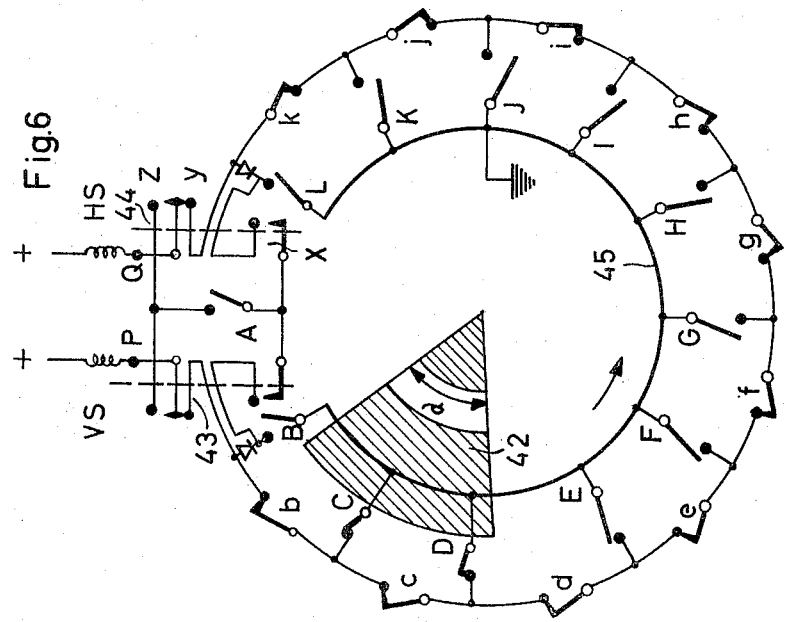
Rolf Dahlin
Göte Johansson
INVENTORS
BY *Wenderoth, Lind & Ponack*
ATTORNEYS

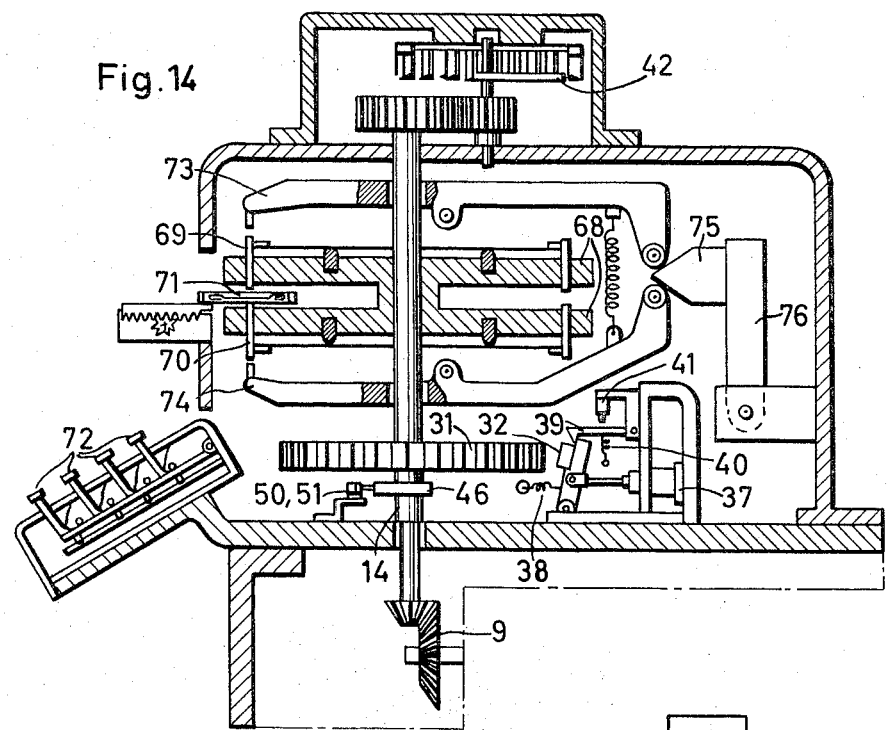
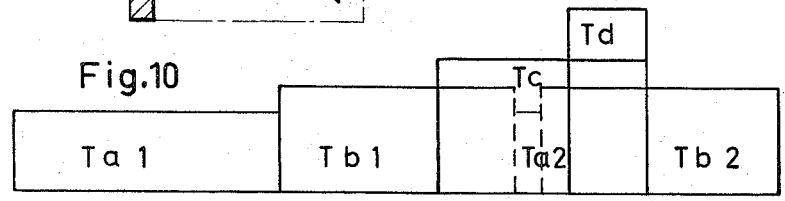
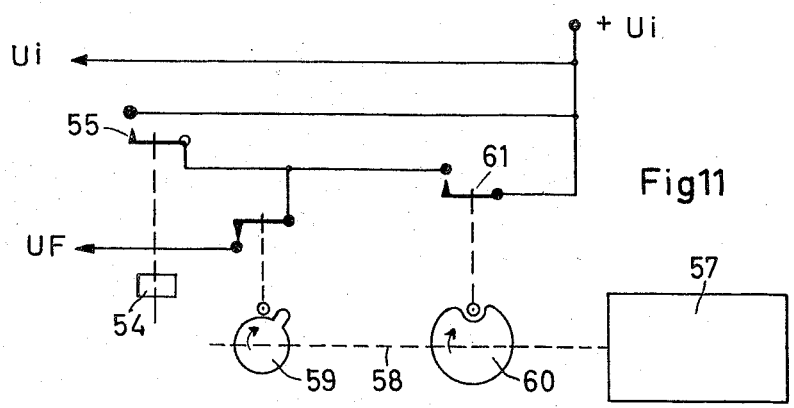

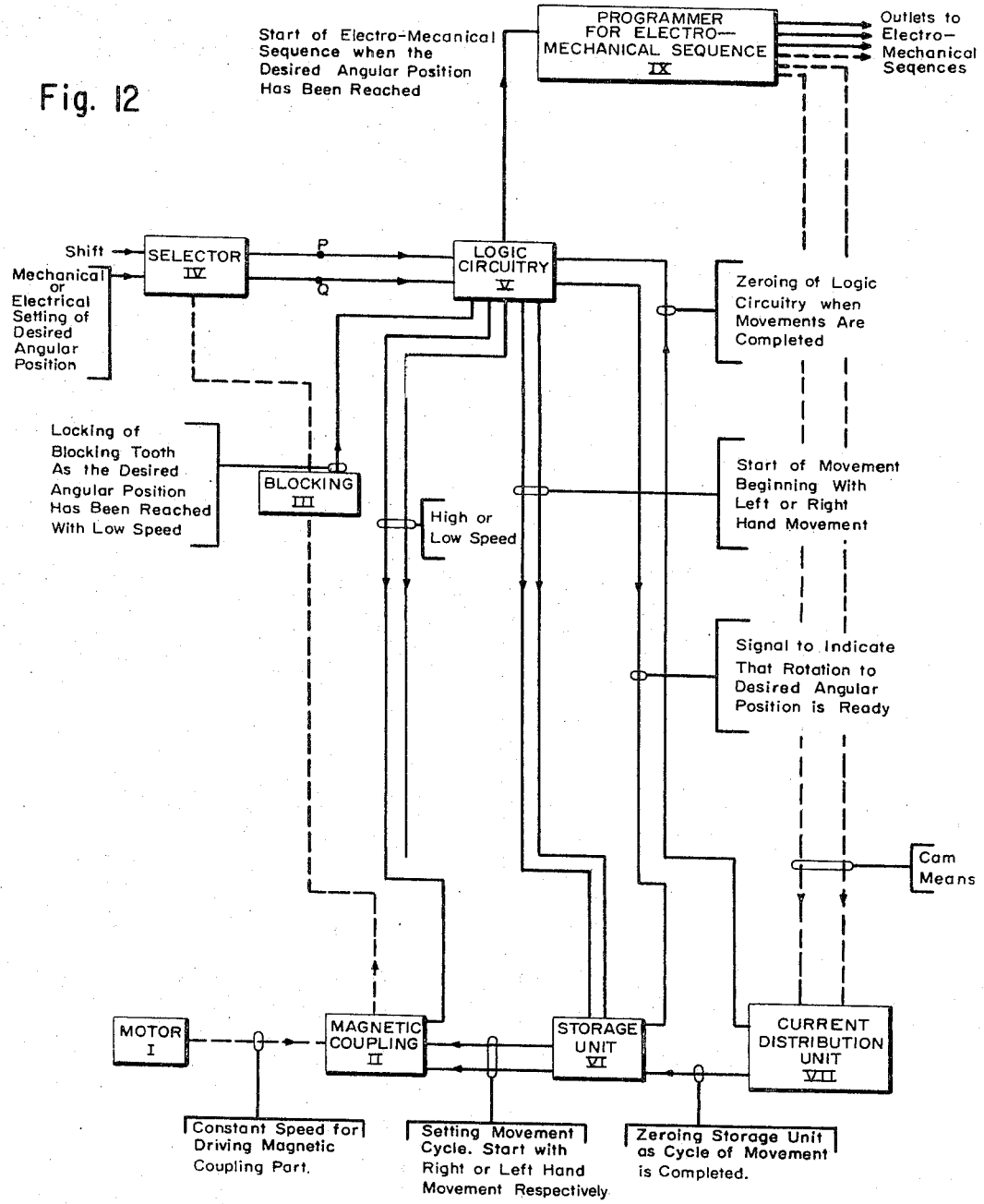

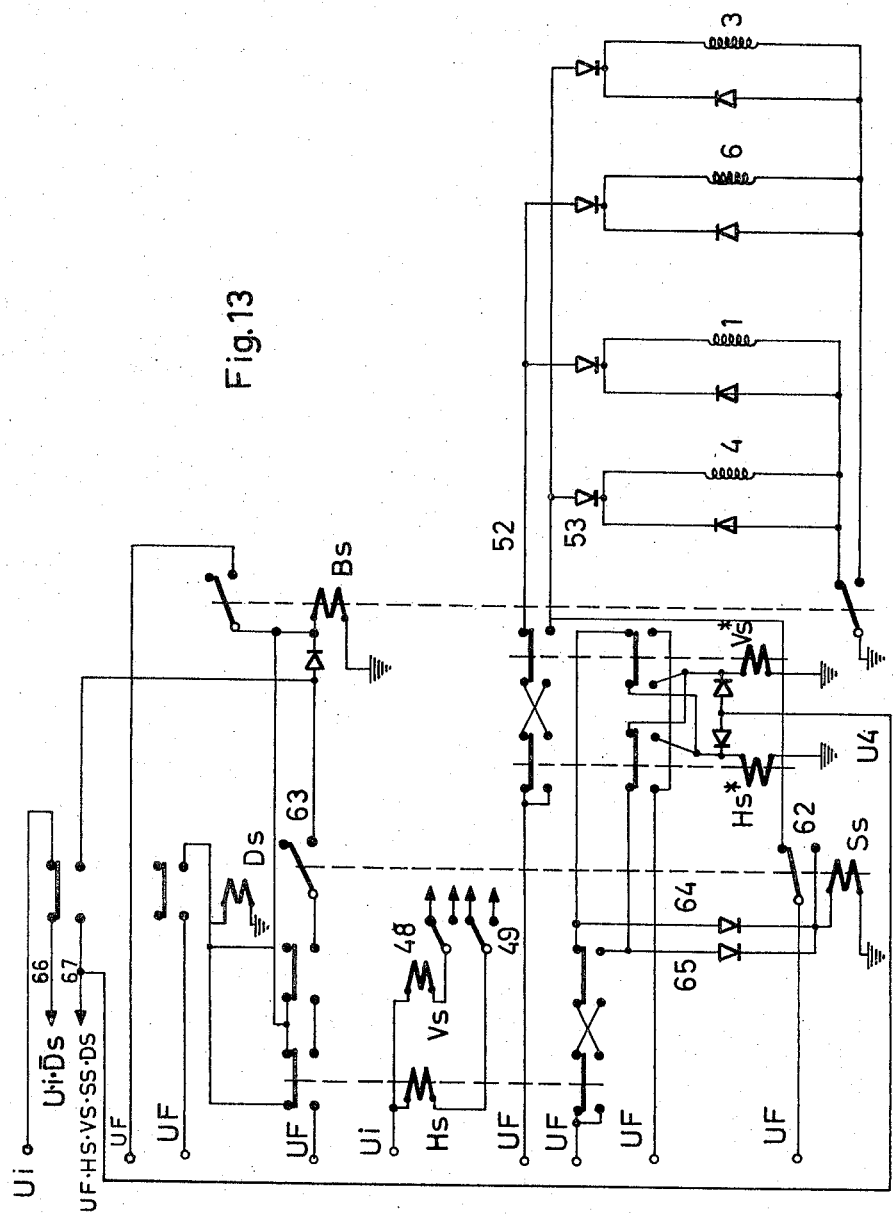

United States Patent Office 3,306,416
Patented Feb. 28, 1967

3,306,416
ELECTROMECHANICAL CONTROL FOR EMBOSSING MACHINES WHICH ROTATES FONT PAST AND BACK TO SELECTED CHARACTER
Rolf Dahlin and Göte Johansson, Jamjoslatt, Sweden, assignors to Citograf Aktiebolag
Filed June 23, 1965, Ser. No. 466,371
Claims priority, application Sweden, June 24, 1964, 7,680/64
4 Claims. (Cl. 197—6.6)

The invention relates to an electromechanical control device for the setting of a movable member in predetermined positions, consisting of driving means, power transmitting means disposed between the latter and the movable member, and selector means for selecting the position desired for the movable member on each separate occasion.

The particular object of the invention has been to provide a simple and reliable control device of the kind mentioned which particularly exhibits the advantage of operating very rapidly despite its simplicity.

For this purpose, the controlling device according to the invention is chararterized substantially by a plurality of operating contacts connected in parallel, a plurality of preferably key-operated rest contacts connected in series and each connected between operating contacts adjoining each other in pairs, the operating contacts being adapted to be closed in pairs by means of a movable member in dependence on the movement of this member and each end of the series of rest contacts having connected thereto an electromagnetic or similar information relaying means for connecting the power transmitting means to drive the movable member in one direction or the other to the position in which the breaking position occurs of the momentarily broken rest contact.

According to the invention, it is convenient that the information relaying means are adapted to influence a system of elements adapted to operate in dependence on a combination of the conditions of the information relaying means.

Further, it is convenient according to the invention that the power transmitting means between the driving means and the movable member consists of a magnetic coupling operated gearing. The gearing may contain either two double magnetic couplings for driving alternately at high and low speed in two directions or four single magnetic couplings for corresponding alternate driving at high and low speed, respectively, in two directions. A more simple variety having only two magnetic couplings for movement in one and the other direction respectively is also imaginable. In this case, it may become necessary to sacrifice the rapidity of setting to obtain a considerable simplification of the whole system.

For accurate positioning of the movable member it is particularly convenient according to the invention that the movable member is combined with a positioning member movable together therewith, such as a ratchet wheel, with which a stationary blocking member, such as a ratchet tooth, is adapted to cooperate when the setting of the movable member in the desired position has been at least nearly completed. In view of the desirable rapidity and the required force it is convenient that the ratchet tooth is biased towards blocking position by means of a strong spring and held in its non-blocking position by means of a spring-actuated, magnet-operated pawl, the ratchet tooth being restorable into its non-blocking position by means of a strong magnet.

The invention is generally applicable to any member movable in a fixed path, i.e. linearly as well as circularly movable members. However, the invention has been created especially in connection with a key-operated embossing machine, the positionable member being a rotatable shaft. It is preferable that said operating contacts are disposed in an annular path to be actuated, in pairs, by an actuating sector rotatable together with the rotatable shaft.

In a practical application of the invention, it has been found especially advantageous to design the device such that the selector consisting of the operating contacts and the sector for actuation thereof has associated therewith, shifting means for shifting the functions of the system in such a way that for each preselection of the desired position by actuation of the corresponding rest contacts either one or the other of two out of phase positions of the rotatable shaft is set in dependence on the momentary position of said shifting means.

Some practical and structural considerations have led to the assumption that it is most advantageous to design the selector as well as the rest of the device in such a manner that to set the rotatable shaft in a predetermined position said actuating sector is first rotated at high speed in one direction to and beyond the desired position and is then stopped and returned at lower speed to be stopped again in the exact position desired; thereby particularly the setting speed may reach extremely high values without a great constructive effort and complexity having to be taken into account.

The shifting means mentioned may be designed in many ways, but a particularly simple embodiment is characterized in that the system connected after the information relaying members contains two shift contact groups, one of said contact groups being operable manually, whereas the other contact group is operable by means of a cam on the rotatable shaft.

Technically, it is convenient according to the invention that the information relaying means, in the form of relays, for instance, are adapted to operate as a logic circuitry to close and break the subsequent circuits in dependence on their own conditions as well as on the attainment of such conditions in a chronological order. It is preferable that the logic circuitry is associated with a storage unit consisting of two relays or other coupling means, for instance, which is adapted to represent, for a predetermined period of time, the condition assumed immediately prior thereto by the information relaying means, independently of how these information relaying means position themselves during this period of time, the arrangement conveniently being such that the coupling means of the storage unit are adapted in their storing position to assume alternately one or the other of their both alternative conditions and, on being concurrently switched on (or switched off), to cause the power supply from the driving means to the rotatable shaft to be interrupted and, if desired, also to cause a restoration of the other elements comprised in the system connected after the information relaying means to their initial positions.

The invention will be described in detail below with reference to the accompanying drawings.

FIGURE 1 is a basic diagram of a selector device;
FIGURE 2 shows schematically a magnetic coupling operated gearing;
FIGURE 3 shows an alternative of the gearing in FIG. 2, in which four single magnetic couplings are used;
FIGURE 4 shows schematically a blocking device;
FIGURE 5 is a view of a modification of the blocking device in FIG. 4;
FIGURE 6 shows a further development of the selector device shown basically in FIG. 1;
FIGURE 7 is an extended and clarifying diagram of part of the connection diagram in FIG. 6 relating to the shift system;
FIGURE 8 shows diagrammatically a so-called logic circuitry in the device according to the invention;

FIGURE 10 is a time table showing how certain connection stages overlap;

FIGURE 11 shows schematically a current distribution unit;

FIGURE 12 is a block diagram of the device according to the invention;

FIGURE 13 is a combination of some of the circuits in the above figures;

FIGURE 14 shows schematically some main parts of the key-operated embossing machine according to the present invention.

The electromechanical control device according to the present invention is particularly intended to be used in a key-operated embossing machine but may, partly, be used in other connections. Therefore, the device will hereinafter first be described with reference to such parts of it as may be generally useful and then it will be described how the device can be adapted for use especially in a key-operated embossing machine.

The device according to the invention is intended for the setting of a movable member in predetermined positions, specifically in predetermined angular positions. These positions may amount to 200 or more per revolution and need not be equidistant, although this is mostly the case in practice. Primarily, the selection of angular positions occurs within one revolution, but it is comparatively simple to expand the device to a multiple revolution device; in this case it is differentiated between equal angular positions in dependence on whether there is a difference in revolutions of +1, +2, +3 and so on.

On terminating the setting in the predetermined position there follows, according to the invention, a release and a completion of one or more electromechanical cycles which may consist of the operation of magnetic couplings, magnetic brakes, so-called traction magnets, magnetic valves of various kinds, or a more or less extensive sequence of such operations.

Beside the required driving means, generally an electric motor, the positioning is carried out by means of a magnetic coupling operated gearing, for instance, as will be explained in detail below.

For accurate positioning a blocking member is used which is adapted to cooperate with means movable together with the member to be set in predetermined positions as will likewise be described in detatil below.

Preferably the movement occurs at two different speeds, viz. an initial high speed and a concluding lower speed. The selection of the two different speeds may take place in different ways.

It has been indicated that the positioning device is useful for positioning in the case of linear movements as well as rotary movements. To simplify matters, the device according to the invention will be described below substantially with reference to the setting of predetermined angular positions without the invention being limited thereto.

Figure 1:
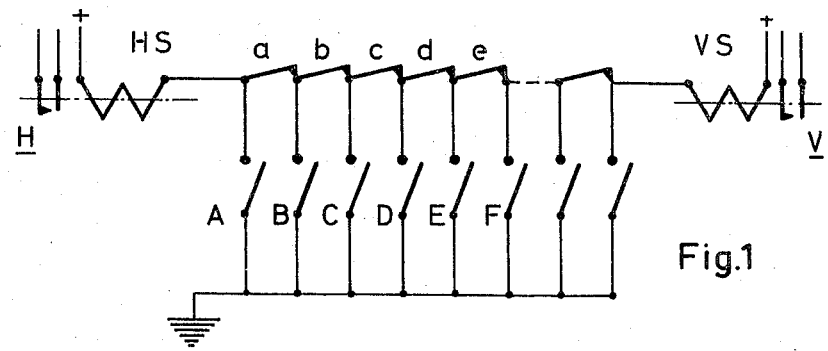

Referring particularly to FIG. 1 of the drawings, this figure shows a basic diagram of a selector device consisting of a plurality of rest contacts $a$, $b$, $c$, $d$, etc. and a plurality of operating contacts A, B, C, D, etc. as well as two relay coils HS and VS. The rest contacts $a, b, c \ldots$ are broken on actuation of a key and the operating contacts are closed by e.g. a cam on a cam disk which may be the disk to be positioned or may consist of a cam disk rotating together with that disk.

Let it be assumed that by depressing a key, for instance, the contact $c$ is broken and that because of the rotation of the disk the contacts A and B have been closed, then current passes through the relay coil HS so that the contact H is closed. Thereby a magnetic coupling is energized for engagement so that the adjustable member is driven at high speed in this direction, i.e. to the right as will be described in detail with reference to FIGS. 2 and 6. This rotary movement continues uninfluenced until the rotary member, in this assumed case a rotary disk, has moved so far that the contacts C and D are closed. Because of current passing also through the coil VS the selector will then in the way described in detail below receive information that the desired position has been reached for the first time, and the magnetic coupling for low speed in the opposite direction, i.e. to the left, is then engaged. The rotary disk then turns back and gradually the contacts C and D are closed for the second time. Thereby information is received that the desired position has been reached for the second time and that blocking in this position may take place. It is characteristic of the selector that on reaching the correct position one contact on either side of this position is closed. As explained below, however, it is permissible in some intermediate positions, that only one operating contact is closed for current to pass through eight one of the relay coils HS and VS.

Of course, other means may be used instead of the relay coils shown, and likewise the potentials may be different from those indicated.

It will be appreciated that the essential thing is for the information transmitters of the selector, i.e. the members HS and VS, to influence a system adapted to operate in dependence on a combination of the conditions of the members HS and VS. If the excited condition is designated by 1 and the unexcited condition by 0, the following table may be drafted:

| Stage | HS | VS | Set movement | Actual movement | Remarks |
| --- | --- | --- | --- | --- | --- |
| Ia | 1 | 0 | High speed to the right engaged. | Start at high speed to the right. | |
| Ib | 1 | 0 | High speed to the right engaged. | High speed to the right. | |
| IIa | 1 | 1 | Low speed to the left engaged. | High speed to the right. | |
| IIIa | 0 | 1 | Low speed to the left engaged. | Retarding movement to the right. | Preparation for stopping next time. HS=VS. |
| IIIb | 0 | 1 | Low speed to the left engaged. | Low speed to the right. | |
| IVa | 1 | 1 | Stop | Strong retarding movement. | |
| IVb | 1 | 1 | Stop | None | Other operation started. |

It is apparent that conditionally the stages IIa and IVa are equal. To distinguish them from each other the circuitry is such that the excitation of HS and VS in time preceded by stage III gives stage IV and not stage II.

The structure of the device basically described above may be divided into the following units:

I.—Motor
II.—Magnetic coupling part
III.—Position blocking means
IV.—Selecting and position feeling means (selector)
V.—Unit containing the logic circuitry
VI.—Storage unit for the logic circuitry
VII.—Current distribution unit
VIII.—Current supply unit
IX.—Unit for electromechanic operation after positioning The units listed above will now be described separately.

The motor I is the prime mover and is adapted to drive the magnetic coupling part II. The magnetic coupling part may be characterized as a magnetic coupling operated gearing. The output shaft from this gearing is also the output shaft from the control device according to the invention. Different arrangements are possible for this gearing in that so-called double couplings and also ordinary single magnetic couplings may be used.

Figure 2:
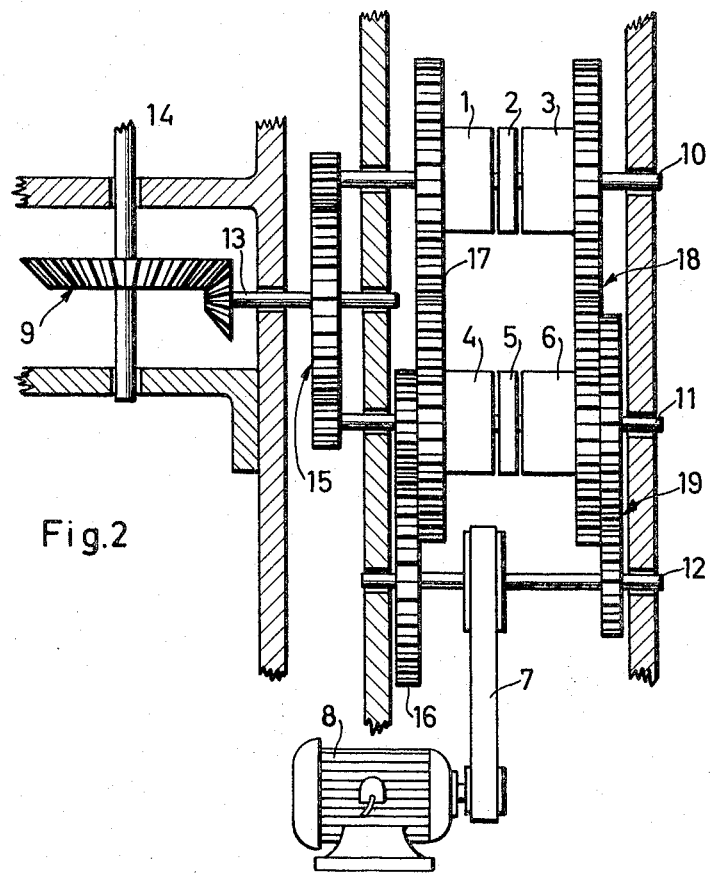

FIGURE 2 shows an example of a magnet-operated gearing having double magnetic couplings. The figure shows a coupling part 1 for rotation at high speed clockwise, for instance, rotating on the shaft 10. 2 designates a coupling part non-rotatably connected to the shaft 10, and 3 designates a coupling part for low speed rotation clockwise, for instance, on the shaft 10. Further, there is shown a coupling part 4 for high speed rotation anti-clockwise on the shaft 11, a coupling part 5 non-rotatably connected to the shaft 11 and a coupling part 6 for low speed anti-clockwise rotation on the shaft 11. 7 designates a belt transmission from motor 8, and 9 is a conical gear. 10 is a shaft for rotating the output shaft 14 clockwise over the gears 9 and 16, while 11 is a shaft for rotating the output shaft 14 anti-clockwise over the gears 9 and 16. 12 and 13 are idler shafts, and 15, 16, 17, 18 and 19 are the required cylindrical gears. It should be mentioned that the transmissions, gears and couplings used may be of any known kind and that the present invention only relates to their structural connection for obtaining the desired positioning movements.

The coupling parts 1, 3, 4 and 6 contain solenoids which on excitation engage the corresponding speed gear. When all the coupling parts are unexcited, the output shaft 14 is not driven.

Figure 3:
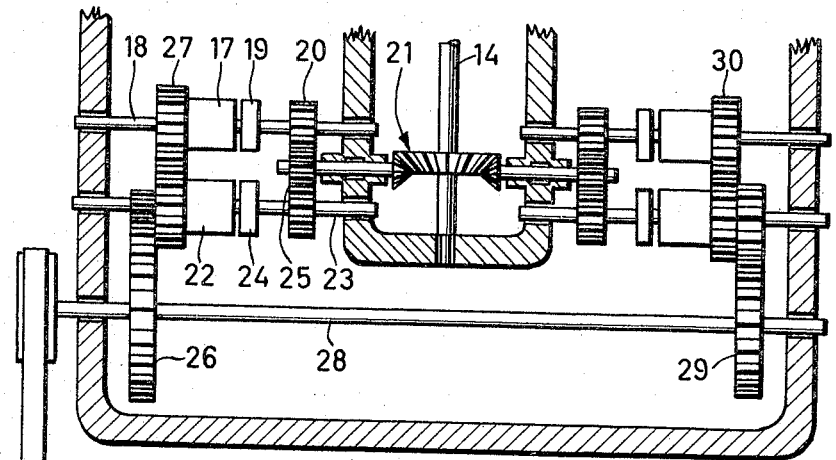

The alternative gearing shown in FIG. 3 is built up of two almost symmetrical parts. The part shown to the left in the drawing is the high speed part, while the part shown to the right is the low speed part.

The left gear part contains a coupling part 17 rotatably journalled on the shaft 18 and provided with a solenoid for high speed clockwise. This shaft 18 carries a coupling part 19 non-rotatably connected thereto. When engaged, the coupling 17, 19 drives the output shaft 14 at high speed clockwise over the cylindrical gear 20 and conical gear 21. Further, the left gear part contains a coupling part 22 rotatably journalled on the shaft 23 and provided with a solenoid for high speed clockwise, and a coupling part 24 non-rotatably connected to the shaft 23. On engagement of the coupling 22, 24 the shaft 23 drives the output shaft 14 at high speed anti-clockwise over the cylindrical gear 25 and the conical gear 21. The high speed part of the gear box is driven over the cylindrical gear 26, 27 from the idler shaft 28, and the low speed part, which is basically like the high speed part, is driven from the same idler shaft over the cylindrical gear 29, 30.

For accurate positioning the output shaft 14 from the gear box is, for instance, provided with a ratchet wheel 31 non-rotatably connected to the shaft. This wheel should have one tooth for each angular position to be assumed by the output shaft 14. A movable blocking tooth 32 is provided to engage the recesses between the teeth of the wheel for accurate positioning of the output shaft 14. In other directions this tooth 32 should of course be immovable in relation to the frame of the device.

An alternative is to provide two or more movable engagement teeth and four teeth on the ratchet wheel. By displacing the engagement teeth an odd number of pitches in the case of two teeth being used it is possible to obtain the desired number of accurate positions.

Figure 4:
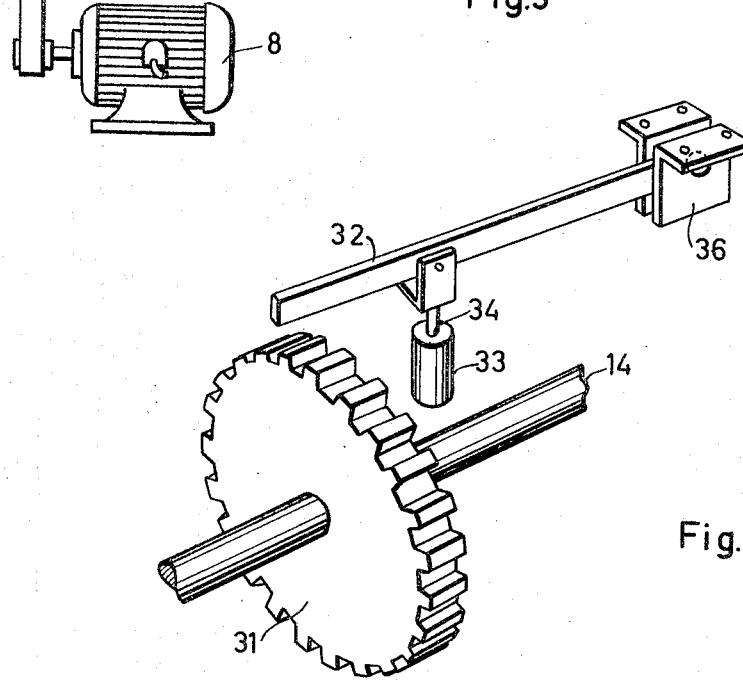

The movable tooth 32 is operated by means of an electromagnet 33 connected to the tooth by its rod 34. As shown in FIG. 4, the tooth is pivotally journalled in a bracket 3 in the frame of the device.

Figure 5:
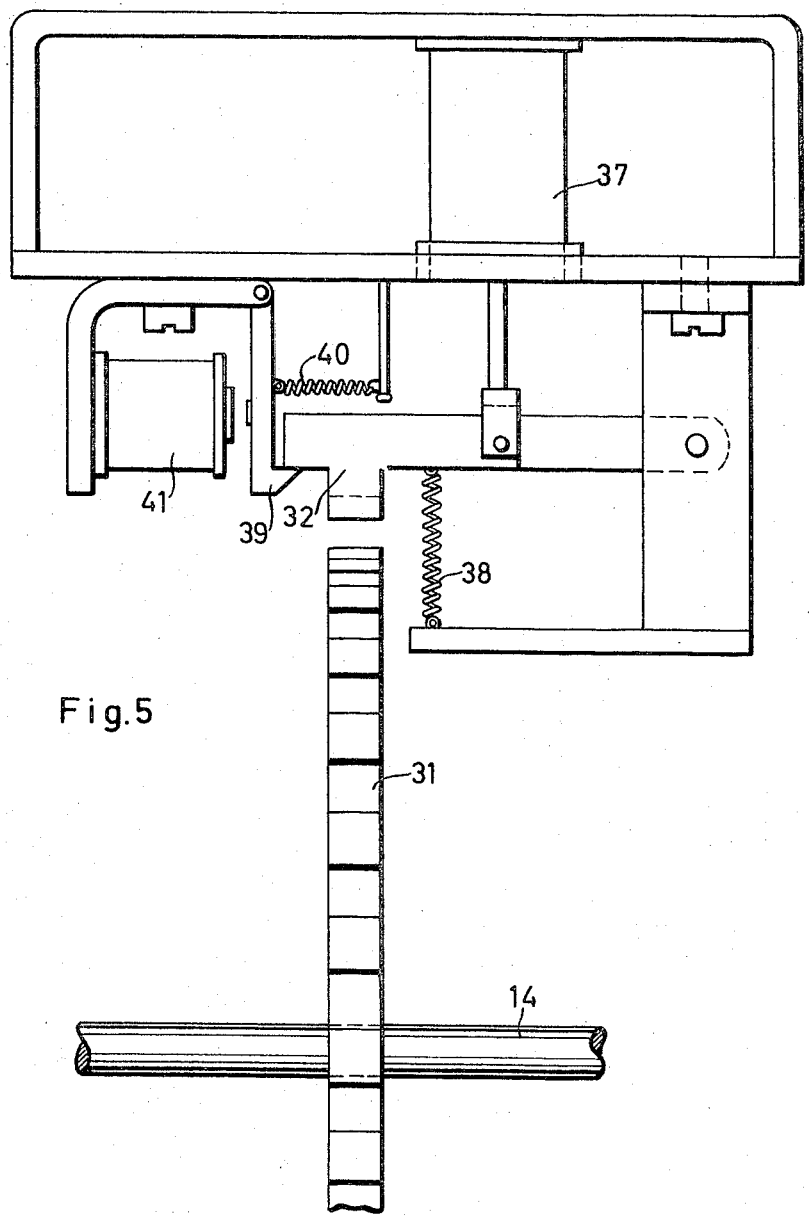

In practice, the engagement of the movable tooth 32 must occur very rapidly, and conveniently the structure shown in FIG. 5 is used for this purpose.

There, a larger magnet 37 is used for tensioning the mechanism against the action of a rather strong spring 38. Further, the tooth 32 is kept in raised position by means of a releasable latch 39 which is, in turn, kept in blocking position by a spring 40. The latch 39 is releasable by means of a smaller electromagnet 41. It will be appreciated that the larger magnet 37 is only used for tensioning the mechanism and that the blocking of the toothed wheel 31 in the set position occurs as soon as the magnet 41 is energized.

The selecting and position feeling device has been described in principle above with reference to FIG. 1. In practice, however, the selector must be made more complex inter alia because it is circular and not linear. Further, there will be certain complications if, as is often the case in practical applications, two different angular positions of the output shaft 14 have corresponding to them only one setting of a desired position on the selector part proper. For instance, this is the case when the selection of the desired position is made by means of a typewriter keyboard. To each depression of a key correspond two different positionings of the output shaft 14 from the gear. The choice between these two positionings is made by means of a shift key. For simplicity, a system is first described in which only one positioning of the output shaft 14 from the gear box corresponds to a positioning of the selector part. Otherwise, this description relates to a circular selector.

In FIG. 6 of the drawings, 42 designates a sector rotating with the output shaft 14 and connecting those operating contacts A, B . . . L which are enclosed in the sector angle $\alpha$, $b$, $c$ . . . $k$ designate rest contacts for selection of the desired position of the rotary shaft 14, and 43 and 44 are contact groups for selecting one only of the two rotary positions of the shaft in which the sector 42 closes the contacts A and B and A and L, respectively. In the non-actuated position, the line from VS to HS is closed over said contacts $b$ . . . $k$ and the contact groups 43 and 44, respectively.

Said operating contacts A, B . . . L are operating contacts actuated into closing position by the periphery of the sector 42. In the drawing, 45 designates a current bar leading to the potential 0 or some other suitable potential.

It may be assumed that the sector 42 closes the contacts C and D and stands symmetrically over them, i.e. turned slightly anticlockwise from the position shown, and that the breaking contact $g$ is broken by manual actuation of a key, for instance, or by a current impulse to a relay containing the rest contact $g$. The current path through VS being closed to earth, this causes initiation of a movement anti-clockwise provided that at the breaking of contact $g$ a starting impulse for the cycle has been given. The path of the current through HS is then broken.

The rotating shaft 14 now turns the sector 42 anti-clockwise in the drawing and thereupon one or more of the contacts C, D, E, F, and G closes the path of current through VS to earth so that the rotary movement is continued. When the sector 42 has been turned so far anti-clockwise, that the contact H is closed, the path of current through HS will be closed to earth for the first time during the cycle. This condition indicates to the rest of the system that the desired position with the sector 42 symmetrically over G and H, i.e. exactly opposite the intended position $g$, has been almost or entirely reached. In the embodiment described here, the pattern of rotation of the rotary shaft 14 is built up such that the desired position is passed once at a high speed whereupon a return takes place at a low speed in the opposite direction. In describing the selector, however, this fact need not be taken into consideration as the performance of the selector is not, per se, influenced by this more complicated pattern of movement.

If it is assumed, instead, that the positioning should be characterized by a closing of either of the positions A and B or L and A, say L and A, and the sector 42 is assumed to stand symmetrically over C and D as in the preceding example, the contact $x$ is first closed and the shift contact $yz$ is shifted so that $z$ is closed while $y$ is broken. This may be done manually, by relays or in some other convenient way. Now, HS can be connected to earth only if A and L are closed simultaneously by the sector 42.

Like in the preceding example, VS is energized, because this relay coil is connected to earth over the closed contacts C and D. This starts a rotation anti-clockwise, like in the previous example, of the contacts C and D, D and E etc. up to the contacts K and L being closed progressively to keep VS energized as described above.

When the rotation has proceeded so far that contacts L and A are closed, VS is connected to earth over contact L and concurrently HS is connected to earth over contacts A and L. This condition indicates to the system that the desired position with the sector 42 symmetrically over contacts L and A, i.e. exactly opposite the desired position $x$, has been nearly or entirely reached. Here, the same provision must be made as after the previous example, viz. that no complete cycle of movements has been described but only the function of the selector in the case of various positions and positionings.

As mentioned, it may be convenient in some cases that each position of the selector has corresponding to it two positions of the rotary shaft; the same selector may be used with the addition of a simple shift system and a gearing between the selector shaft and the main rotary shaft, i.e. the above-mentioned output shaft 14, so that the selector shaft makes two revolutions while the main rotary shaft makes one revolution. (The selector shaft is not shown in FIG. 7.) The shift system consists of two shift contact groups 48, 49, and 50, 51 for selection of the desired one of the two possible positions. One contact group 48, 49 is operated manually or in some other suitable way and the contact group 50, 51 is operated by means of a cam disk 46 on the main rotary shaft, for instance. These contact groups and the cam disk have a simple and readily understandable influence on the paths of current from the selector to HS and VS.

To describe the function, the selector in the preceding figures is separated from the relay coils VS and HS in the points P and Q and is connected to the corresponding points at FIG. 7. The positions of the shift contacts 48, 49 and 50, 51 shown in this figure connect VS to P and HS to Q. These positions remain for all rotary positions within a sector of 180° of the main rotary shaft. Thus, it is possible to select positions within this sector of movement of the main rotary shaft. However, within the said sector of 180° the sector disk 42 moves within a twice as large angular range i.e. 360°, in consequence of the previously mentioned gearing between the selector shaft and the main rotary shaft. Now, if a posioning is desired within the other 180° sector of the range of rotation of the main rotary shaft, the shift contacts 48, 49 are reversed by actuation of the shift member 47 which may consist of a key or a relay system. Then the relay coil VS will be connected to Q and the relay coil HS to the contact point P. The consequence of this reversion will be that the sector 42 in FIG. 6 will move in the opposite direction as compared with what has been described with reference to FIG. 6, i. e. when no shift occurred. When no shift occurs, the sector 42 moves by the shortest route to the intended position, and when shift does occur with the consequent opposite direction of movement of the sector 42, said sector 42 moves by the longest route to the intended position. Owing to said gear ratio of 1:2, the main shaft will obviously seek a position which is displaced half a revolution in relation to the closest position on the main rotary shaft which has the same correspondence in the selector part.

Regarding the unit containing the logic circuitry, the following table is referred to which shows the four different stages in chronological order. To provide this chronological division into stages while starting from HS and VS, these two relay coils or connecting members are combined with two other reversible members BS and DS as well as two reversible storage means HS* and VS*. A dash above certain functions indicates, in the table, a negation of the function in question.

| Stage | Logical function | Result |
| --- | --- | --- |
| Ia | Alt. I: $HS \times \overline{VS} \times \overline{BS} \times \overline{DS}$ | $HS^* \times \overline{VS}^*$ with holding during rotation. |
|  | Alt. II: $\overline{HS} \times VS \times \overline{BS} \times \overline{DS}$ | $\overline{HS}^* \times VS^*$ with holding during rotation. |
| IIa | $HS \times VS \times \overline{BS} \times \overline{DS}$ | BS. |
| IIIa | Alt. I: $\overline{HS} \times VS \times BS \times \overline{DS}$ | DS. |
|  | Alt. II: $HS \times \overline{VS} \times BS \times \overline{DS}$ | DS. |
| IVa | $HS \times VS \times BS \times DS$ | Ratchet tooth engaged to stop; other sequences start. |

Figure 8:
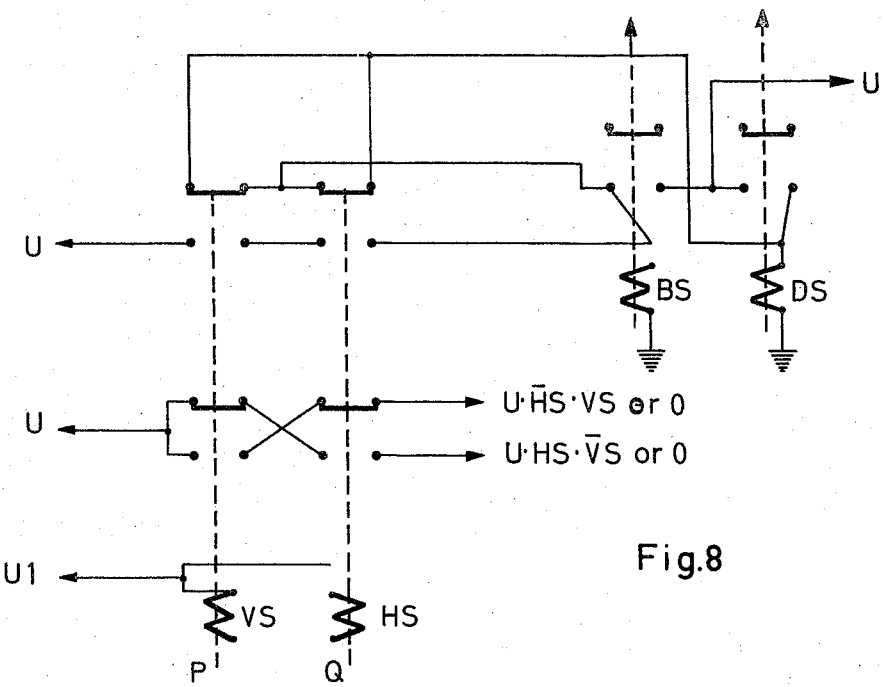

By means or relays, for instance, the functions stated in the Table II can be obtained by means of a circuit of the kind shown in FIG. 8 of the drawings. The circuit shown will probably need no detailed explanation. It should only be remarked that U and U1 indicate positive voltages or 0, in dependence on the stage of the time cycle, while $HS \overline{VS}$ and $\overline{HS}.VS$ indicate impulses supplied to a storage unit described later. The outputs of the relays ES and DS may be utilized to control the above-mentioned electromechanical cycle in the desired way. Of course, it is possible also in this case to obtain similar functions by means of transistors, for instance.

Figure 9:
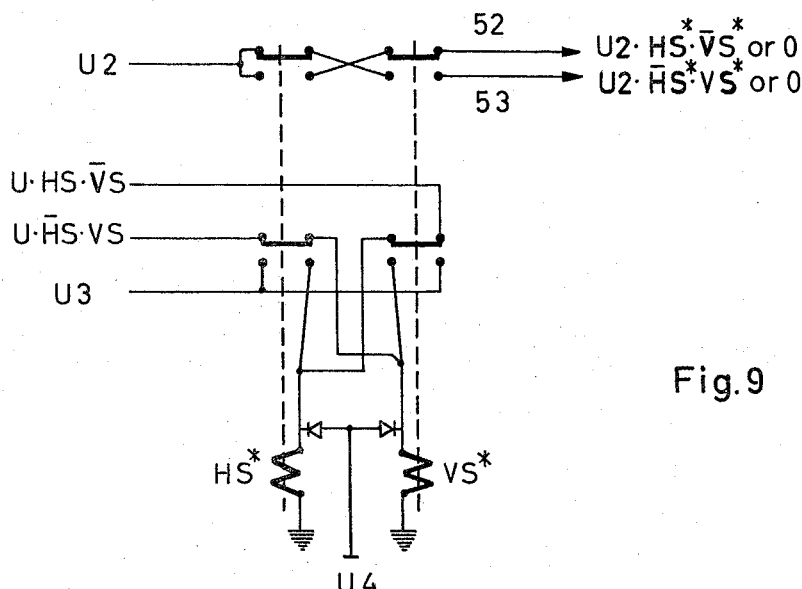
FIGURE 9 shows schematically a so-called storage unit of the logic circuitry in FIG. 8.

As regards the storage unit of the system, FIG. 9 in the drawing is referred to. This unit is designed such that a voltage impulse $HS.\overline{VS}$ should give $HS^* \overline{VS}^*$ during a certain part of the time cycle independently of how HS and VS then position themselves during this cycle. Reversedly, an impulse $\overline{HS}.VS$ should give $\overline{HS}^*.VS^*$ under a certain part of the time cycle independently of how HS and VS then position themselves during the cycle. These functions should be clear from FIG. 9.

In FIG. 9, the designation U2 indicates a line coming from the current distribution unit of the system and leading a positive voltage pulse or 0, in dependence on the stage of the time cycle. U3 is a line coming from the current distribution unit and leading a holding current for the relay coil HS* or VS* or having the potential 0, in dependence on the stage of the time cycle. If desired, this line may have the same potential as the line U2. The two lines $U.HS.\overline{VS}$ and $U.\overline{HS}.VS$ should be compared with FIG. 8, wherein both these lines are indicated as output lines from the circuit shown therein.

The two lines 52 and 53 are output lines leading to the magnetic couplings in FIGS. 2 and 3. As mentioned previously these magnetic couplings give an initially set cycle of movements and are controlled in such a way by the contacts shown on top of FIG. 9 that the movement becomes either high speed to the right with subsequent low speed to the left or high speed to the left with subsequent low speed to the right independently of various settings of the two relays HS and VS occurring later. Coupling from high speed to low speed occurs by means of the relay BS shown in FIG. 8, and the contacts shown on top of FIG. 9 thus only serve to select one or the other group of directions.

The line U4 in FIG. 9 leads positive voltage or 0 in dependence on the stage of the time cycle. It may be mentioned here that the rotation of the main shaft is stopped entirely when all the magnetic couplings are unexcited. To obtain this the output lines 52 and 53 shown in FIG. 9 must be dead and this is obtained when the two relays HS* and VS* are energized simultaneously. As just described, only one of the relays HS* and VS* is switched on during one part of the time cycle, and thus the voltage pulse on the line U4 is utilized to obtain the concurrent switch-on of the relays in question necessary for the stopping. As an alternative, the arrangement may be such that the relays in question are instead switched off simultaneously to obtain the stopping.

Some of the progresses of the device according to the invention may overlap. For instance, FIG. 10 shows that after switching on the device there may be a stand by period $Ta1$ before a positioning command is given. Thereupon the positioning progress $Tb1$ is immediately initiated and may be slightly overlapped by certain electromechanical progresses $Tc$. During the termination of the latter, a new stand by period $Ta2$ may rise and, also, a new positioning progress $Tb2$ be initiated. During the latter part $Tc$ of the progress a preparation cycle $Td$ may occur in the course of which remaining excitation currents, if any, may be broken off.

As already mentioned, FIG. 11 shows a current distribution unit. This unit contains at least one member 54 which may be a mechanically blockable bar actuated by each one of the keys in a key-operated embossing machine or the like, or which may consist of a relay. When the member 54 has been actuated the contact 55 is closed and leads current along the path $+Ui$, the contact 55, the contact 56 and to the output terminal UF. The unit 57 shown schematically consists of a timing unit for the electromechanical progress occurring after positioning. This unit has a shaft 58 with two cam disks 59 and 60. The cam disk 60 serves to close a contact 61 that, as shown, can supply current to the output terminal UF even if the contact 55 is broken because the actuation of the member 54 ceases. The cam disk 59 serves to break the contact 56 at least for a short time on one or almost one revolution of the shaft 58 and thereby to break off the supply of current to the terminal UF whereby all the connecting circuits affected are returned into their initial positions. If necessary, a constant current may be taken out over the output terminal $Ui$. It should be remarked that in the most simple applications the output terminal UF corresponds to the indicated input terminals U, U2, U3, while $Ui$ may correspond to U1 in FIG. 8.

As mentioned previously, the device according to the invention must of course also contain a current supply unit, but as such units are known in great variety, and form no part of the invention it will not be necessary to give any detailed description in this context.

Said unit for the electromechanical progress has for its purpose to have some operation performed on completion of the positioning. Of course, a plurality of different electromechanical progresses are possible, and therefore it will not be necessary to enter into any detailed description in the present context. Here, only the cooperation of this unit with the positioning system described above is of interest, and this cooperation takes place when starting and stopping the electromechanical unit. This cooperation has been described as an example with relation to FIG. 11, wherein the unit 57 is assumed to represent the electromechanical unit and the cam disks 59, 60 are responsible for the start and stop phases together with the member 54 indicated schematically.

As mentioned, FIG. 12 is a block diagram of the device according to the invention and serves to clarify the above description. The required explanations having been introduced in the drawing, it appears superfluous to repeat them here. FIG. 13 is a combination of some of the circuits in the figures previously described. Thus, FIG. 13 shows the magnetic coupling part whose mechanical correspondence is shown in FIG. 2 as well as the so-called logic circuitry to be found in FIG. 8, and the storage unit shown in FIG. 9. In addition to this, there is illustrated a special device for rendering possible a repetition of a position already set. Referring to FIG. 13, there is shown for the purpose mentioned a relay SS the shift contact 62 of which leads current directly to the magnetic coupling 4, when the relay is switched off, for anti-clockwise drive at high speed. The contact 63 of the relay SS is broken and prevents the relay BS from being switched on so that functions not permissible in this connection are prevented from being actuated. Now, if a repetition is desired, the device is driven anti-clockwise from its adjusted position and the positioning cycle previously described can start.

When stopping the preceding progress a simultaneous energization of the relays HS and VS is required. When the anti-clockwise drive has proceeded so far that the set position to be repeated has been passed, the relay VS is switched off and thereby the relay SS is energized over the line 64. If the positioning command is not a repetition command the relay SS is fed through either the line 64 or 65 and the first thing to happen is then that the relay is energized to prevent the mentioned dislodgement of the device from its initial position, because the drive is now instead to be carried out in the way initially described.

The lines 66 and 67 to the unit 57 in FIG. 11 and the impulses received through the lines may be utilized for starting and stopping the electromechanical system.

Contrary to the rapidly operating embodiment with four electromagnetic couplings for rotating the main rotary shaft, the embodiment previously mentioned which is simpler and not so rapidly adjustable and which has only two electromagnetic couplings for rotating the main rotary shaft operates such that when the desired position has been reached for the first time the blocking tooth is immediately moved toward the ratchet wheel and thus the rotation of the main rotary shaft is terminated. It is readily appreciated that considerable simplifications may be obtained as compared to the more rapid system.

In this slower version with only one speed in each direction, without over-run, only stages $Ia$, $Ib$, $IIa$, $IVa$ and $IVb$ are to be considered. In principle, only the two left-hand electromagnetic couplings 17, 19 and 22, 24 are needed and the gears from the shaft 28 over these couplings are used as will easily be seen by a comparison with FIG. 3.

As already mentioned, the adjusting and positioning system described above is generally useful but it has been developed especially in connection with the design of a key-operated embossing machine for embossing address printing plates and the like. A most schematic key-operated embossing machine of this kind is illustrated in FIG. 14.

The rotary shaft 14 mentioned carries, in this case, a so-called type disk 68 having type channels for positive and negative embossing types 69, 70 for embossing on an address printing plate 71.

On depression of a key 72 of a typewriter key-board corresponding to the desired character, the type disk is rotated so that the key in question actuates the corresponding contacts $a$, $b$, $c$, etc. in FIG. 1. The type disk is rotated into the desired position in a time cycle of the kind described above and, of course, the above-mentioned electromechanical progress will be the embossing operation proper, which will be started when the type rim has arrived in the correct position. The embossing is carried out by means of two embossing arms 73, 74 which are pivotally journalled and which are, to perform the embossing movement, actuated by a wedge 75 on a pivotal or otherwise operable lever 76.

It will be appreciated that a great number of modifications and alterations of details may be made within the scope of the inventive idea.

What we claim is:

1. An electromechanical positioning apparatus, comprising a movable member movable along a predetermined path and positionable in any of a plurality of predetermined positions spaced along said path, first control means electrically operable for driving said movable member in one direction along its predetermined path, second control means electrically operable for driving said movable member in the other direction along its predetermined path, a sensing member movable along a sensing path in timed relation with the movement of said movable member along its predetermined path, a first electrical circuit terminal, a second electric circuit terminal, a plurality of sensing contacts, spaced along the sensing path of said sensing member to be connected with said first electrical circuit terminal by means of said sensing member during its movement along the sensing path, said sensing member being adapted to connect two adjacent ones of said sensing contacts in each of its positions corresponding to any of the predetermined positions of said movable member and to connect at least one of said sensing contacts in all other positions along the sensing path of said sensing member, a chain of series connected break contacts, each corresponding to one of the predetermined positions of said movable member, electrical means connecting said chain intermediate every two adjacent break contacts of said chain and each end of said chain with an individual one of said sensing contacts, first switching means connected with one end of said chain and with said second electric circuit terminal, second switching means connected with the other end of said chain and with said second electrical circuit terminal, and circuitry means for operating said first control means, when said first switching means alone is energized, and for operating said second control means, when said second switching means alone is energized, and for holding said first and second control means unoperated, when said first and second switching means are both energized, whereby actuation of one of said break contacts results in movement of said movable member to the predetermined position corresponding to said actuated break contact.

2. An electromechanical positioning apparatus according to claim 1, comprising third control means electrically operable for driving said movable member in said one direction along its predetermined path with a lower speed than by means of said first control means, fourth control means electrically operable for driving said movable member in said other direction along its predetermined path with a lower speed than by means of said second control means, and memory means forming part of said circuitry means and serving—upon an overshoot in the movement of said movable member by means of said first or second control means past the predetermined position corresponding to said actuated break contact—to operate said fourth or third control means, respectively, for moving said movable member back to the last-mentioned predetermined position at a low speed.

3. An electromechanical positioning apparatus according to claim 1, comprising a sensing make contact, operable by means of said sensing member, said sensing member being rotatable so that its sensing path is circular, said sensing make contact and said sensing contacts being spaced along the circular sensing path of said sensing member so that said sensing make contact is situated between and in spaced relation to those two sensing contacts being connected by said electrical means with the ends of said chain of said series connected break contacts, and two positioning contact means, each having two operating positions, said positioning contact means connecting in one of their operating positions said first and second switching means, respectively, directly with each one end of said chain and connecting in the other of their operating positions said first and second switching means, respectively, with each one end of said chain through said sensing make contact.

4. An electromechanical positioning apparatus according to claim 3, comprising a rotatable member mechanically coupled with said movable member for making one revolution when said movable member makes two revolutions, first reversing switch means, second reversing switch means, said first and second reversing switch means being connected in series between said first and second switching means on the one hand and said two positioning contact means on the other hand and each having two operating positions for connecting said first switching means with the first one and the second one of said two positioning contact means, respectively, and for connecting said second switching means with said second one and said first one of said two positioning contact means, respectively, cam means moving together with said rotatable member and holding said first reversing switch means in one of its operating positions through 180° angular rotation of said rotatable member and in the other of its operating positions through the rest of one revolution of said rotatable member, and shift means for changing the operating position of said second reversing switch means.

References Cited by the Examiner

UNITED STATES PATENTS

| | | | |
|---|---|---|---|
| 2,854,117 | 9/1958 | Berlinsky et al. | 197—6.6 X |
| 2,927,676 | 3/1960 | Obbondanza | 197—6.6 |
| 3,029,920 | 4/1962 | Seifried | 197—6.6 |
| 3,223,218 | 12/1965 | Terzariol | 197—6.6 X |
| 3,227,258 | 1/1966 | Pannier et al. | 197—6.6 |
| 3,236,352 | 2/1966 | Schacht | 197—6.6 |

ROBERT E. PULFREY, *Primary Examiner.*

E. S. BURR, *Assistant Examiner.*